US009244498B2

(12) United States Patent
Osann, Jr.

(10) Patent No.: US 9,244,498 B2
(45) Date of Patent: Jan. 26, 2016

(54) REVERSE TOUCHPAD FOR PORTABLE COMPUTERS

(71) Applicant: Robert Osann, Jr., Port Angeles, WA (US)

(72) Inventor: Robert Osann, Jr., Port Angeles, WA (US)

(*) Notice: Subject to any disclaimer, the term of this patent is extended or adjusted under 35 U.S.C. 154(b) by 376 days.

(21) Appl. No.: 13/769,358

(22) Filed: Feb. 17, 2013

(65) Prior Publication Data

US 2013/0321300 A1    Dec. 5, 2013

Related U.S. Application Data

(63) Continuation of application No. 12/750,553, filed on Mar. 30, 2010, now abandoned.

(51) Int. Cl.
*G06F 1/16* (2006.01)
(52) U.S. Cl.
CPC ............... *G06F 1/1692* (2013.01); *G06F 1/169* (2013.01); *G06F 1/1616* (2013.01)

(58) Field of Classification Search
CPC .................. G06F 3/041; G09G 5/00
See application file for complete search history.

(56) References Cited

U.S. PATENT DOCUMENTS

| 6,591,001 | B1 | 7/2003 | Oda et al. |
| 2002/0034964 | A1 | 3/2002 | Bannai et al. |
| 2009/0213081 | A1* | 8/2009 | Case, Jr. .................. 345/173 |
| 2009/0250515 | A1 | 10/2009 | Todd et al. |
| 2010/0207909 | A1 | 8/2010 | Wu et al. |
| 2010/0227642 | A1 | 9/2010 | Kim et al. |

* cited by examiner

*Primary Examiner* — Tony N Ngo

(57) ABSTRACT

A portable computer is described including a reverse-mounted touchpad and associated buttons where the touchpad is mounted on the reverse surface of the panel containing the portable computer's display and facing away from the user. One or more associated buttons are mounted on the surface of the display panel facing the user and function as the buttons normally associated with a touchpad, traditionally called the "mouse buttons". The buttons are mounted in close proximity to the reverse-mounted touchpad such that the user can operate both the touchpad and the buttons simultaneously with a finger and the thumb of the same hand.

15 Claims, 5 Drawing Sheets

REVERSE TOUCHPAD FOR PORTABLE COMPUTERS

CLAIM OF PRIORITY

This application is a Continuation of U.S. patent application Ser. No. 12/750,553 filed on Mar. 30, 2010 and entitled "Reverse Touchpad for Portable Computers" by inventor Robert Osann, Jr., said application commonly assigned with the present application and incorporated herein by reference.

CROSS REFERENCE TO RELATED APPLICATIONS

This application is related to U.S. patent application Ser. No. 12/750,573 filed Mar. 30, 2010 and entitled "TOUCHPAD WITH REVERSE-MOUNTED BUTTONS" by inventor Robert Osann, Jr.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to input devices used for control of computers and in particular touchpad cursor position controls and the buttons that normally are associated with cursor control—in traditional terms, "mouse buttons".

BACKGROUND

At least two existing problems are solved by the instant invention. The first problem shows up most readily when using a laptop computer on an airplane, especially if the user's arms are relatively long. The location of a conventional touchpad on laptop computers today places it in the center of the keyboard closest to the user. Thus, when using the touchpad, the users arms stick out to the side and their elbows interfere with their neighbors in adjacent seats. This is especially apparent when the space (legroom) in front of the user is minimal, and even more so when the person sitting in the seat in front of the user reclines their seat, further restricting the space in front of the user and causing them to attempt to use their computer with it pressed against their stomach.

The second problem shows up on small "netbook" or phone-sized portable computing devices where the keyboard is miniaturized and is roughly the size of the computer case. As a result, there is not room for a conventional touchpad cursor control and other cursor control means must be used. A touch-screen can mitigate the problem, however a touch screen can be difficult to use for fine cursor positioning in many applications, plus it adds cost. The ability to add a conventional touch pad would be useful for some configurations of small computing devices and communication devices.

SUMMARY

By adding a touch pad on the reverse side of the display of a portable computer, the touchpad function can be used without consuming any keyboard space, or if added in addition to the conventionally-located touchpad on a laptop computer, can enable the user to operate the cursor controls with their arm extended forward, rather than having their elbows sticking out to the sides or contorting their arms in an uncomfortable manner to avoid disturbing their neighbors in adjacent seats when riding as a passenger on an airplane or other conveyance. Such enhancements will make a laptop computer considerably more "airplane-friendly", or in general "travel-friendly", when a user is faced with operating a laptop computer in a confined space.

In a preferred embodiment of the instant invention, the touchpad is located on the reverse side of the display panel, and the "mouse buttons" are located on the front side of the panel, opposite the touchpad and at the edge of the display panel. Thus, such a touchpad is typically operated with the middle finger or index finger and the mouse buttons are operated with the thumb of the same hand. The touchpad and associated buttons may be mounted on an assembly suitable for sliding into a receptacle located on the edge of the portable computer's display panel. A particular portable computer may have two such receptacles, one located are each side of the display panel, such that the assembly containing the touchpad and buttons may be inserted on either side. When an assembly containing a touchpad is not inserted into a receptacle, a blanking assembly may be inserted instead.

DETAILED DESCRIPTION OF THE INVENTION

Figure 1:
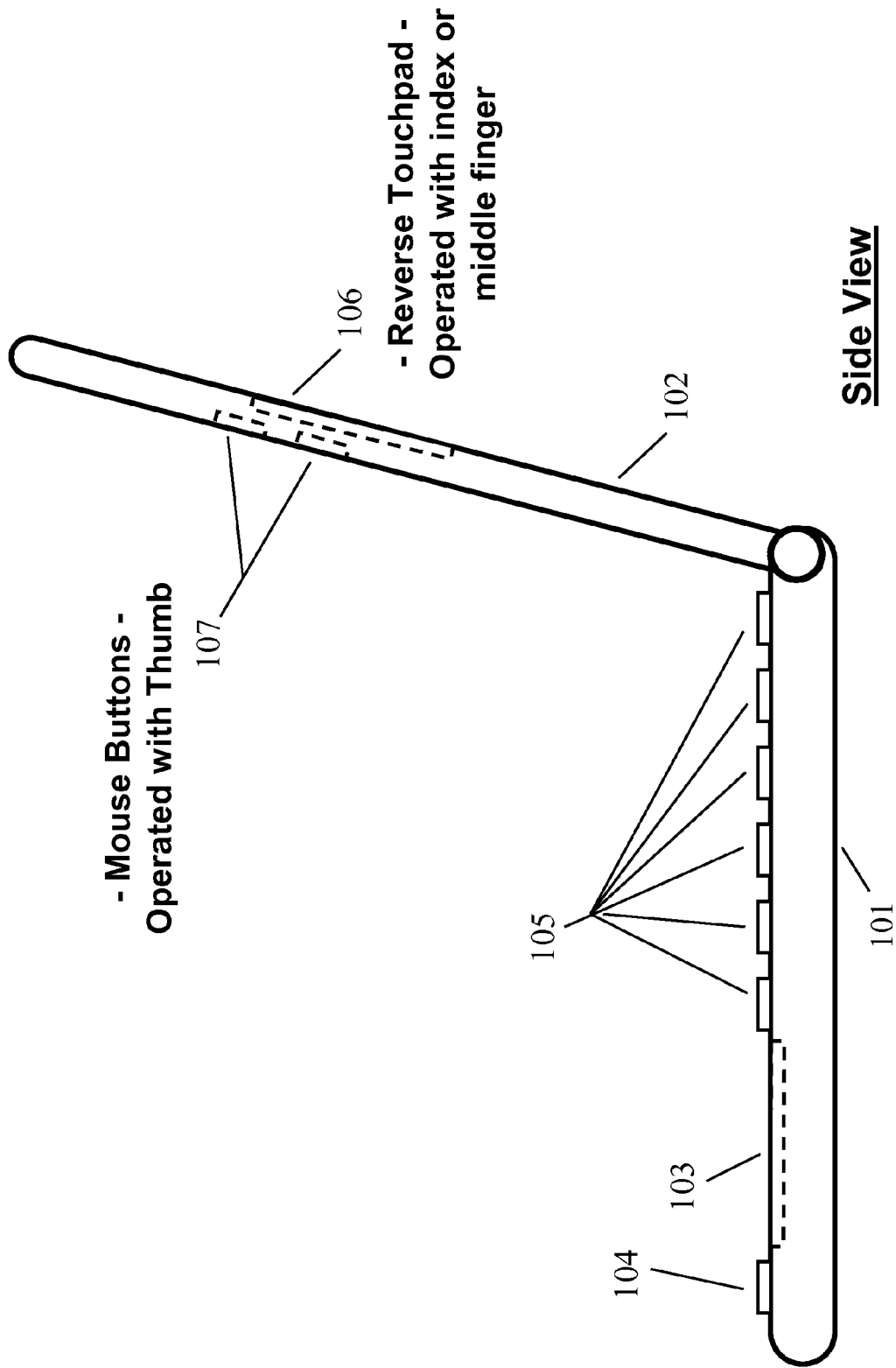
FIG. 1 shows a side-view of a laptop computer according to the present invention with a reverse-touchpad mounted on the back side of the display panel and associated buttons mounted on the front side.

FIG. 1 shows a laptop computer 101 according to the present invention, this laptop computer having a conventional keyboard and touchpad configuration where touchpad 103 and associated "mouse" buttons 104 are located nearest the user and the usual keyboard array 105 is located conventionally, and farther from the user. In addition, reverse mounted touchpad 106 has been mounted on the back-side or reverse surface of display panel 102 and associated buttons 107 are mounted opposite and in close proximity to the reverse touchpad, these buttons mounted at the very edge of display panel 102 and facing the user. With the reverse mounted touchpad and associated buttons located as shown in FIG. 1, the buttons would typically be operated with the thumb of the user's hand, while the touchpad would be typically operated with the middle or index finger of the same hand. Due to the close physical proximity, the operation of these buttons and reverse touchpad can be accomplished simultaneously.

As a general method for operating the cursor controls of a portable computer according to the present invention, the user would reach behind the display panel of a portable computer equipped with a reverse-mounted touchpad and associated buttons, and then operate the touchpad with one of their fingers, not including their thumb. Then, they would simultaneously use the thumb of the same hand to operate an associated button on the front side of the computer's display panel. The coordination of movement of the user's finger on the reverse touchpad with that of the cursor on a computer's display would typically be such that movement directions are equivalent. For instance as judged from the user's perspective, even though their finger on the touchpad is on the reverse side of the display screen, if the finger moves up ward and to the left, the cursor displayed on the computer's display screen would also move upward and to the left.

Figure 2:
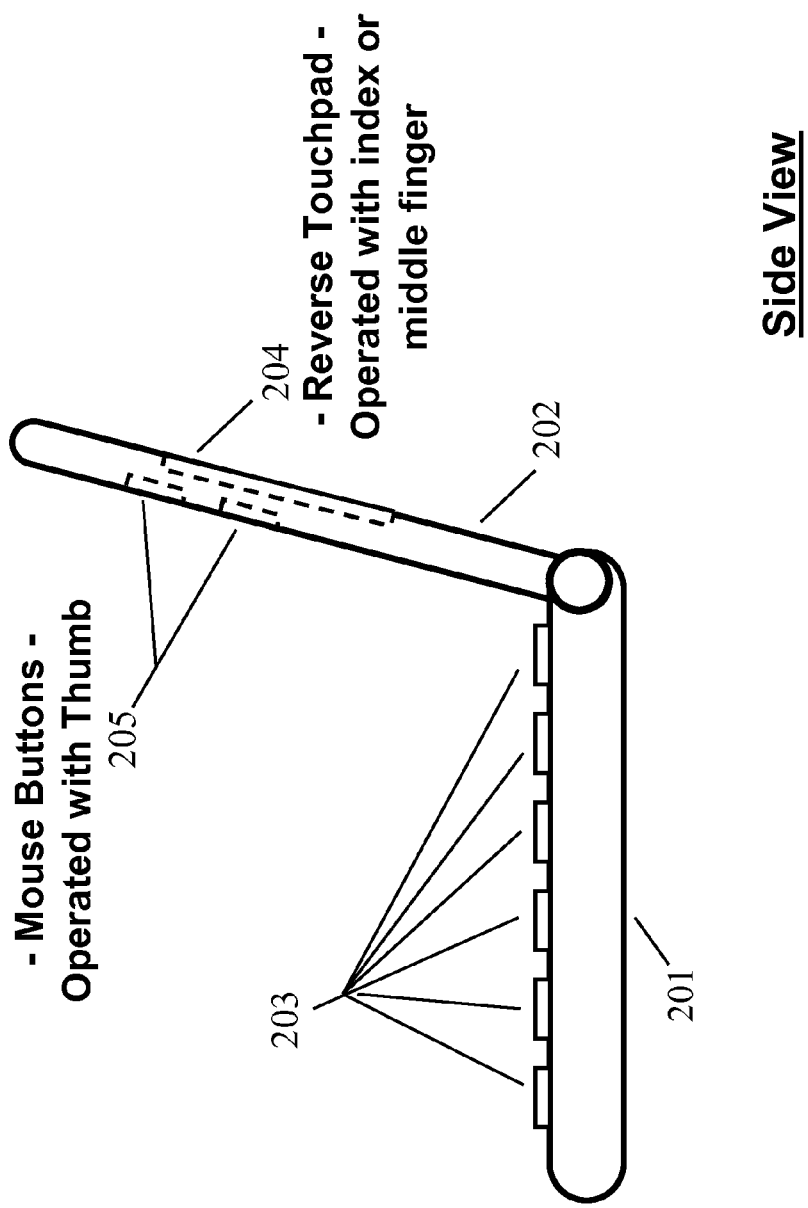
FIG. 2 shows a side-view of a small portable computer according to the present invention with a reverse-touchpad mounted on the back side of the display panel and associated buttons mounted on the front side.

FIG. 2 shows a side view of a small portable computer, computing device, communication device, or smart phone 201 with conventional keyboard 203 and display 202. Here, a reverse touchpad 204 has been included on the backside of display panel 202 and associated mouse buttons 205 have been installed on the front side of display panel 202. This small computing device 201 does not contain a conventional touchpad and therefore other means such as cursor control keys may be utilized if display 202 does not include touch screen functionality. Thus, the inclusion of reverse touchpad 204 and buttons 205 conveniently add cursor control capability without consuming additional surface area and enlarging the overall size of the computer.

Figure 3:
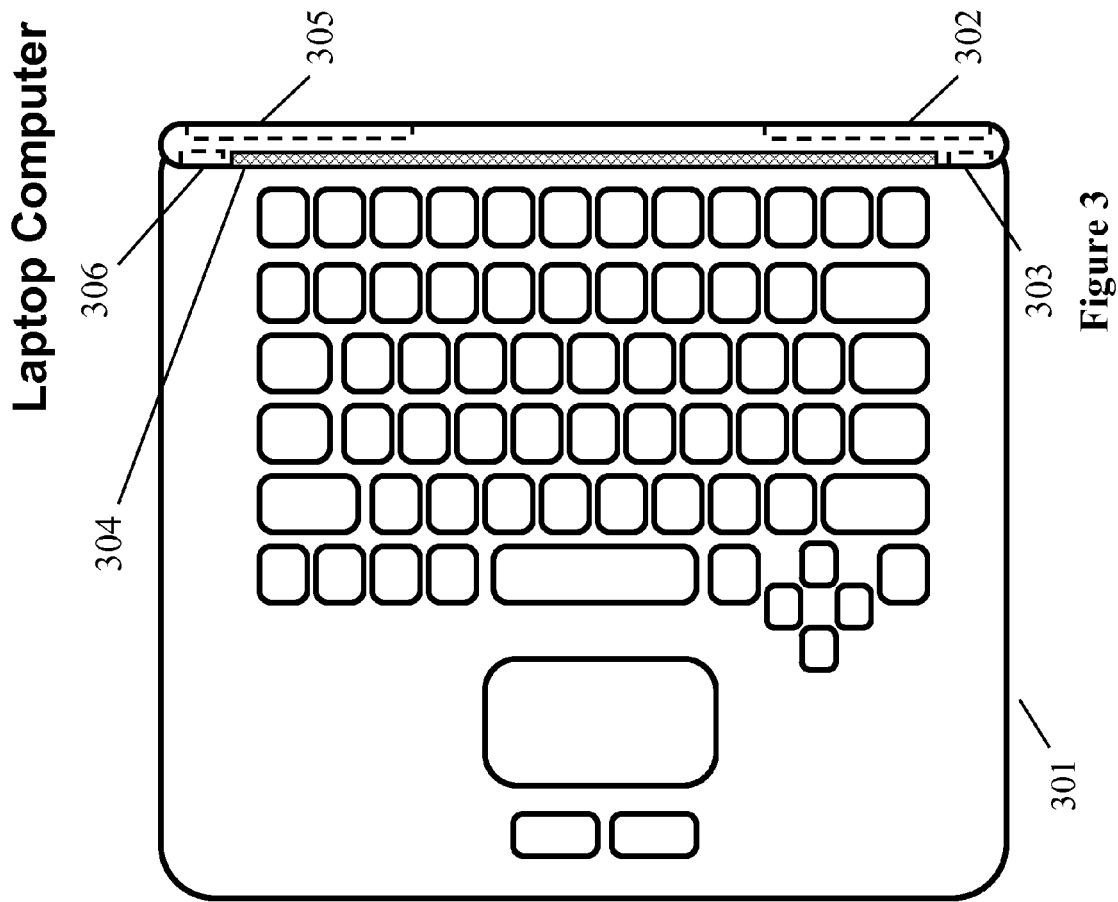
FIG. 3 shows a top-view of a laptop computer according to the present invention with reverse-mounted touchpads on the back side of the display panel and associated buttons mounted on the front side, where one reverse-mounted touchpad and associated buttons are mounted at the left edge of the display panel and the other reverse-mounted touchpad and associated buttons are mounted at the right edge of the display panel.

FIG. 3 shows a top view of a laptop computer 301 such as that described in FIG. 1. Here, a reversed-mounted touchpad 302 has been included on the right side of display panel 304 along with associated buttons 303. Notice that an additional reverse-mounted touchpad 305 has been incorporated at the left side of display panel 304 along with associated buttons 306. Incorporating reverse touchpads on both sides of the display panel provides support for both right-handed and left-handed users.

In some implementations, including reverse touchpads on both right and left sides of the display panel may not be the most cost-effective solution for supporting both right and left-handed users on the same computer. To provide a more cost-effective approach, portable computer 401 in FIG. 4A shows a portion of the portable computer of FIG. 3 and instead includes each reverse touchpad mounting location designed as a receptacle structure formed into display panel 402 such that an assembly such as 403 containing reverse touchpad 405 and associated buttons 404 can slide into the receptacle structure as shown. Once thus attached, assembly 403 not only attaches in a positive manner with some form of latching structure but also makes electrical contact with connections in display panel 402 to enable touchpad 405 and buttons 404 to function properly. For the same assembly 403 to be inserted into a receptacle at either the left or right edge of the portable computer 401, it is important that the electrical contact arrangement provides the correct symmetry to make connections when reversed such that proper connections are made to allow proper operation.

Figure 4:
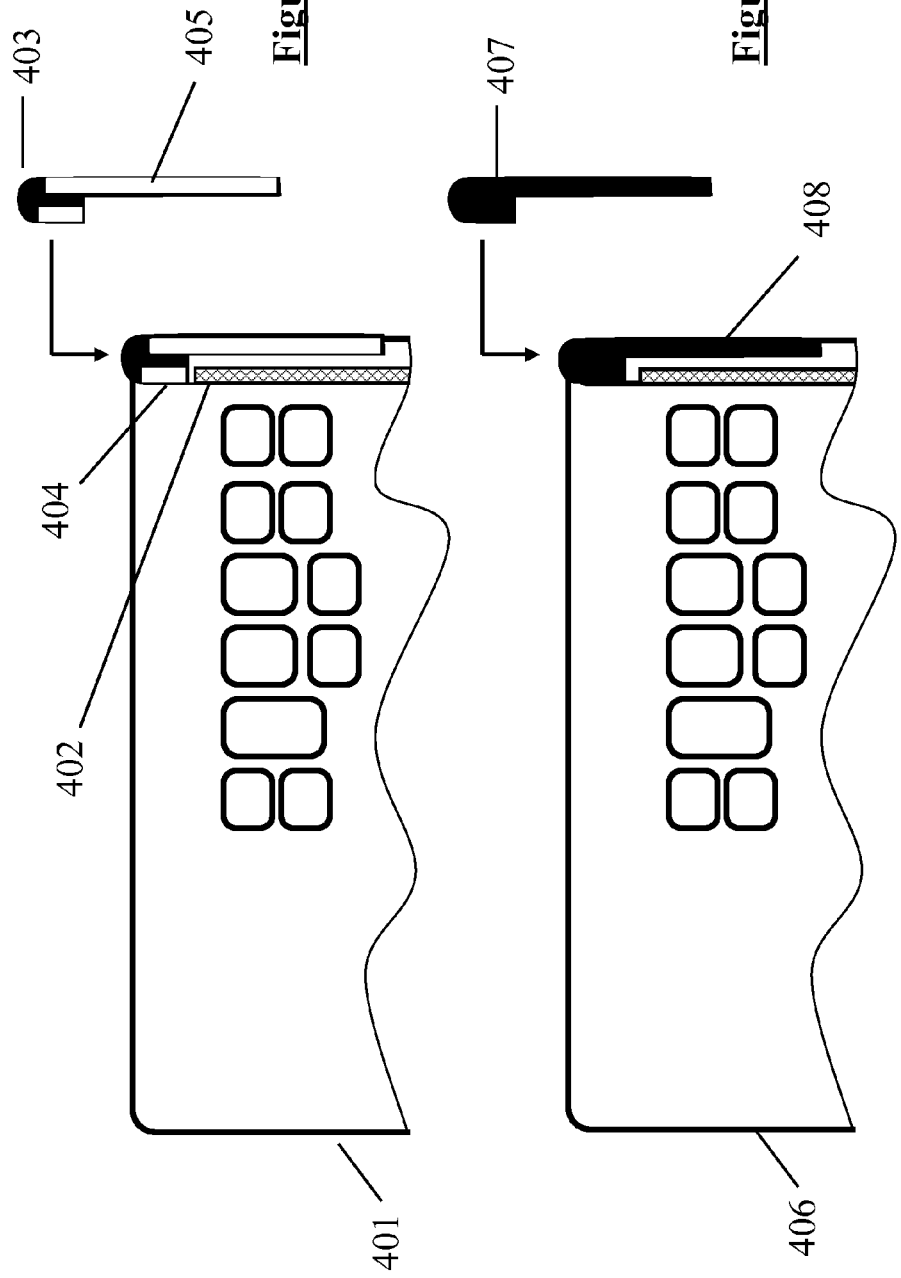
FIG. 4a shows one portion of a portable computer according to the present invention including a receptacle located on the edge of the display panel of the portable computer, the receptacle suitable for accepting a slide-in assembly, where a reverse-mounted touchpad and one or more buttons are mounted on an assembly designed to slide into the receptacle.
FIG. 4b shows the same portion of the portable computer per FIG. 4, except that a blanking assembly has been attached to the receptacle instead of an assembly containing a touchpad.
Figure 5:
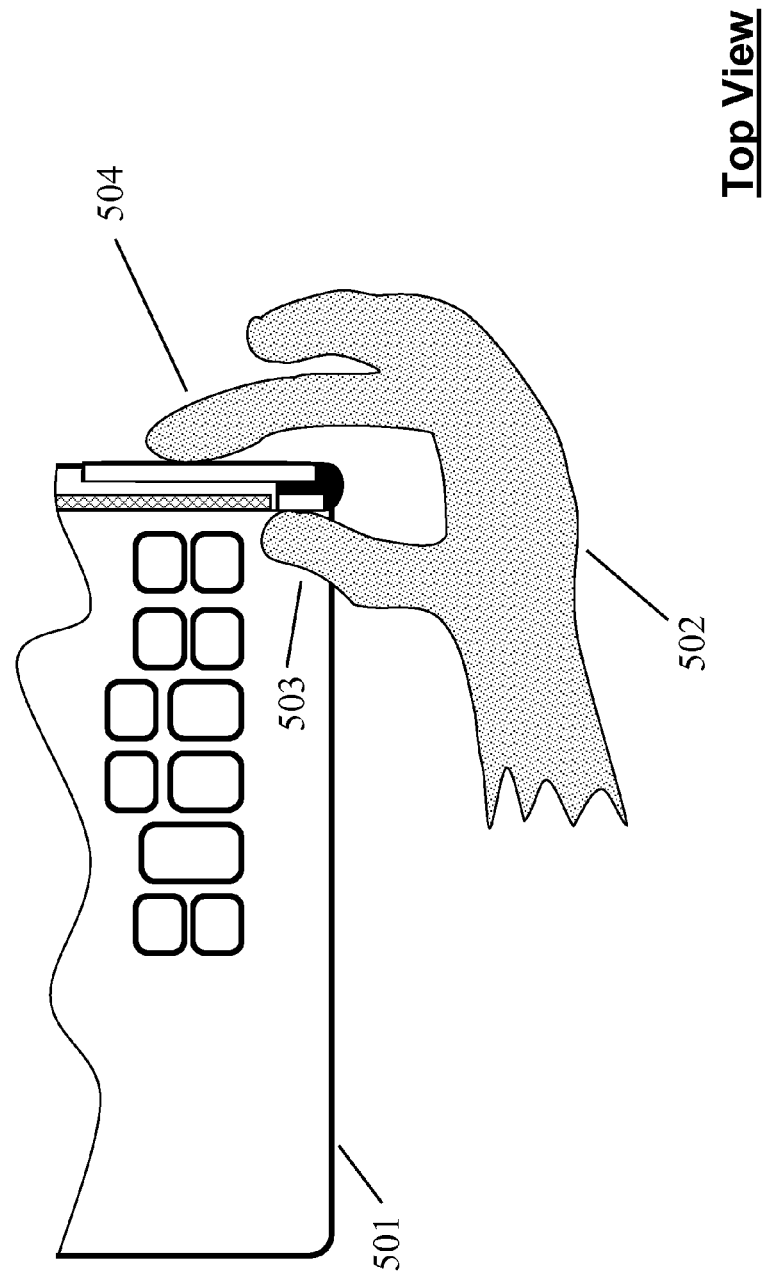
FIG. 5 shows how a reverse-mounted touchpad and associated button(s) according to the present invention are operated with the thumb and a finger of the same hand.

FIG. 4b shows the same portion 406 of a laptop computer as portion 401 in FIG. 4a, however in this case, blanking assembly 407 has been inserted into receptacle structure 408 on the edge of the display panel. A blanking assembly is simply an insert, usually made of plastic, that takes the place of a functional assembly of some kind and fills in the opening in a receptacle. The embodiment of FIG. 4 allows a single assembly containing a reverse-mounted touchpad and associated buttons to be installed at either side of the laptop computer, the functions of the buttons being programmed in software so that "mouse button 1", for example, is in the desired physical position for a particular user. FIG. 5 shows how a reverse-mounted touchpad and associated buttons according to the present invention are operated with the fingers of a single hand. Here, a portion of laptop 501 is shown with a reverse-mounted touchpad and associated buttons installed at the right-hand side of the laptop's display panel. As shown in FIG. 5, the user may simultaneously operate the reverse-mounted touchpad and buttons with the thumb and fingers of a single hand 502. The buttons will typically be operated with the user's thumb 503 while the touchpad is most readily operated with the user's middle finger 504 or alternately their index finger depending on the preference of the individual user.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts, while remaining within the scope of the appended claims. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A portable computer having a conventional folding clamshell configuration including:
   a base unit with a conventionally-located conventional keyboard and a separate display panel hinged to the base unit, the conventional keyboard located adjacent a first conventional touchpad that is also conventionally located on the base unit, wherein the conventionally-located first conventional touchpad is a forward facing conventional touchpad mounted between the conventionally-located conventional keyboard on the base unit and an edge of the base unit facing a user;
   a second, and redundant, conventional touchpad that is mounted on a rear surface of the display panel near a side edge of the display panel, said second conventional touchpad facing away from a user of said portable computer, and not visible by a user during normal use;
   wherein operation of either the first or second conventional touchpad causes a movement of a cursor on a display screen of the display panel of the portable computer; and
   wherein finger movements on the second conventional touchpad cause movement of the cursor in a reverse manner compared with finger movements on the first conventional touchpad when the second conventional touchpad is viewed from the rear of the display panel.

2. The portable computer according to claim 1, further comprising one or more buttons mounted on a surface of the display panel and facing the user, said one or more buttons being in close proximity to and functionally associated with the second conventional touchpad such that the user can operate both the second conventional touchpad and said one or more buttons simultaneously with a finger and a thumb of a hand.

3. The portable computer according to claim 2 wherein said second touchpad and one or more buttons are mounted on a physically separate assembly designed to slide into a receptacle on an edge of the display panel of the portable computer.

4. The portable computer according to claim 3 including two receptacles suitable for accepting said assembly, wherein a first receptacle is located on the left side of the portable computer's display panel and a second receptacle is located on the right side of the portable computer's display panel, said receptacles located as viewed from the perspective of the user of the portable computer.

5. The portable computer according to claim 4 wherein a particular assembly containing said second conventional touchpad and one or more buttons may be attached to either of the two receptacles and operate properly.

6. The portable computer according to claim 4 further including a blanking assembly for attaching to a receptacle where an assembly containing the second conventional touchpad is not attached.

7. A portable computer having a conventional folding clamshell configuration, comprising:
  a base unit incorporating a conventionally-located conventional keyboard and a first conventional touchpad, and one or more first associated buttons conventionally-located between the conventionally-located conventional keyboard and an edge of the base unit facing a user;
  a separate display panel hinged to the base unit;
  a second conventional touchpad mounted on the reverse surface of the separate display panel, said second conventional touchpad facing away from the user of said computer;
  one or more second associated buttons mounted on the surface of the display panel and facing the user, said one or more second associated buttons being in close proximity to the second conventional touchpad such that the user can operate both the second conventional touchpad and said one or more second associated buttons simultaneously with a finger and a thumb of the same hand;
  wherein operation of the second conventional touchpad and the one or more second associated buttons requires the user's arm to be outstretched to at least a length required to reach a rear edge of the base unit of the folding clamshell style portable computer; and
  wherein operation of the second conventional touchpad and the second associated buttons is redundant with operation of the first conventional touchpad and the first associated buttons.

8. The portable computer according to claim 7 wherein said second touchpad and one or more second associated buttons are mounted on a physically separate assembly designed to slide into a receptacle on an edge of the display panel of the portable computer.

9. The portable computer according to claim 8 including two receptacles suitable for accepting said assembly, wherein a first receptacle is located on the left side of the portable computer's display panel and a second receptacle is located on the right side of the portable computer's display panel, said receptacles located as viewed from the perspective of the user of the portable computer.

10. The portable computer according to claim 9 wherein a particular assembly containing said second conventional touchpad and one or more second associated buttons may be attached to either of the two receptacles and operate properly.

11. The portable computer according to claim 9 further including a blanking assembly for attaching to a receptacle where the assembly containing said second conventional touchpad and one or more second associated buttons is not attached.

12. A portable computer having a conventional folding clamshell configuration, comprising:
  a base unit incorporating a conventionally-located conventional keyboard and a first conventional touchpad with associated first set of buttons conventionally-located between the conventionally-located conventional keyboard on the base unit and an edge of the base unit facing a user;
  a separate display panel hinged to the base unit;
  a second, and redundant, conventional touchpad mounted on a reverse surface of the separate display panel, said second conventional touchpad facing away from the user of said computer and not visible by a user during normal use, with a second set of associated buttons located in close proximity to the second conventional touchpad and mounted on an edge of the display panel facing the user;
  wherein operation of the second conventional touchpad and associated second set of buttons is redundant with operation of the first conventional touchpad and associated first set of buttons; and
  wherein operating cursor position controls and associated buttons on the personal computer comprises the method of:
    when the user has un-restricted elbow room to their side, extending an elbow to their side and operating the first conventional touchpad and associated first set of buttons in a conventional manner;
    when the user has restricted elbow room to their side, extending an arm forward to reach behind the display panel of the portable computer with at least one finger of a first hand to operate the second conventional touchpad, while operating said second set of associated buttons with a thumb of the first hand; and
    wherein operation of the second conventional touchpad and associated second set of buttons requires the user's arm to be outstretched to at least a length required to reach a rear edge of the base unit of the folding clamshell style portable computer.

13. The method of claim 12, wherein operating the at least one of the second set of associated buttons occurs simultaneously with said operating the second conventional touchpad.

14. The method of claim 12 wherein said at least one finger is the middle finger of the first hand.

15. The method of claim 12 wherein said at least one finger is the index finger of the first hand.

* * * * *